Feb. 27, 1934.   J. A. MACREADY ET AL   1,948,587
REFRIGERATING APPARATUS
Filed June 29, 1929     7 Sheets-Sheet 1

Inventor
John A. Macready
William H. Matthews
By Spencer, Hardman & Fehr
Attorney

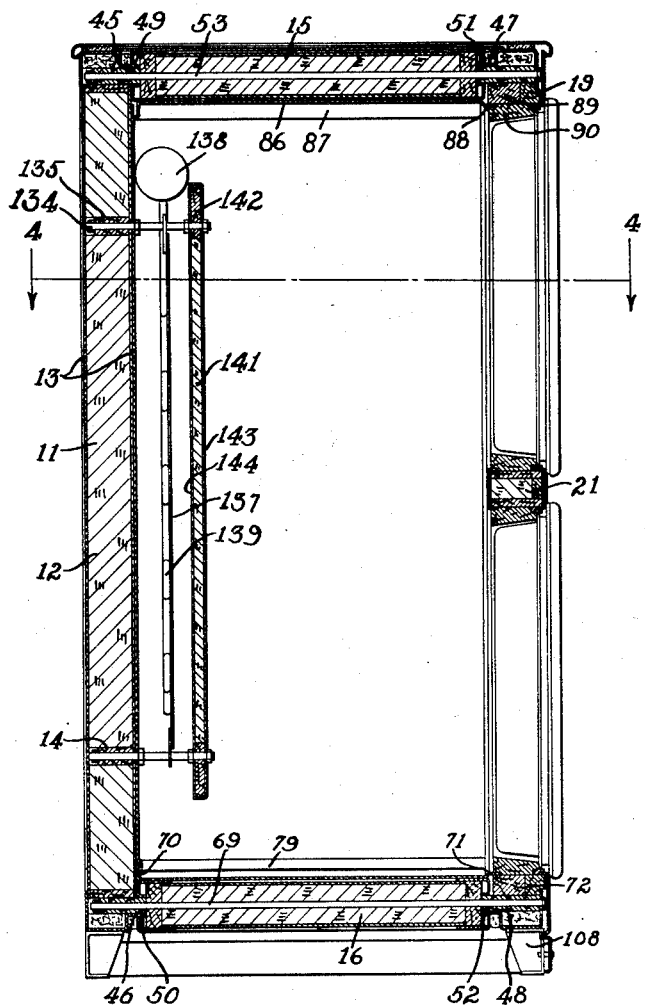

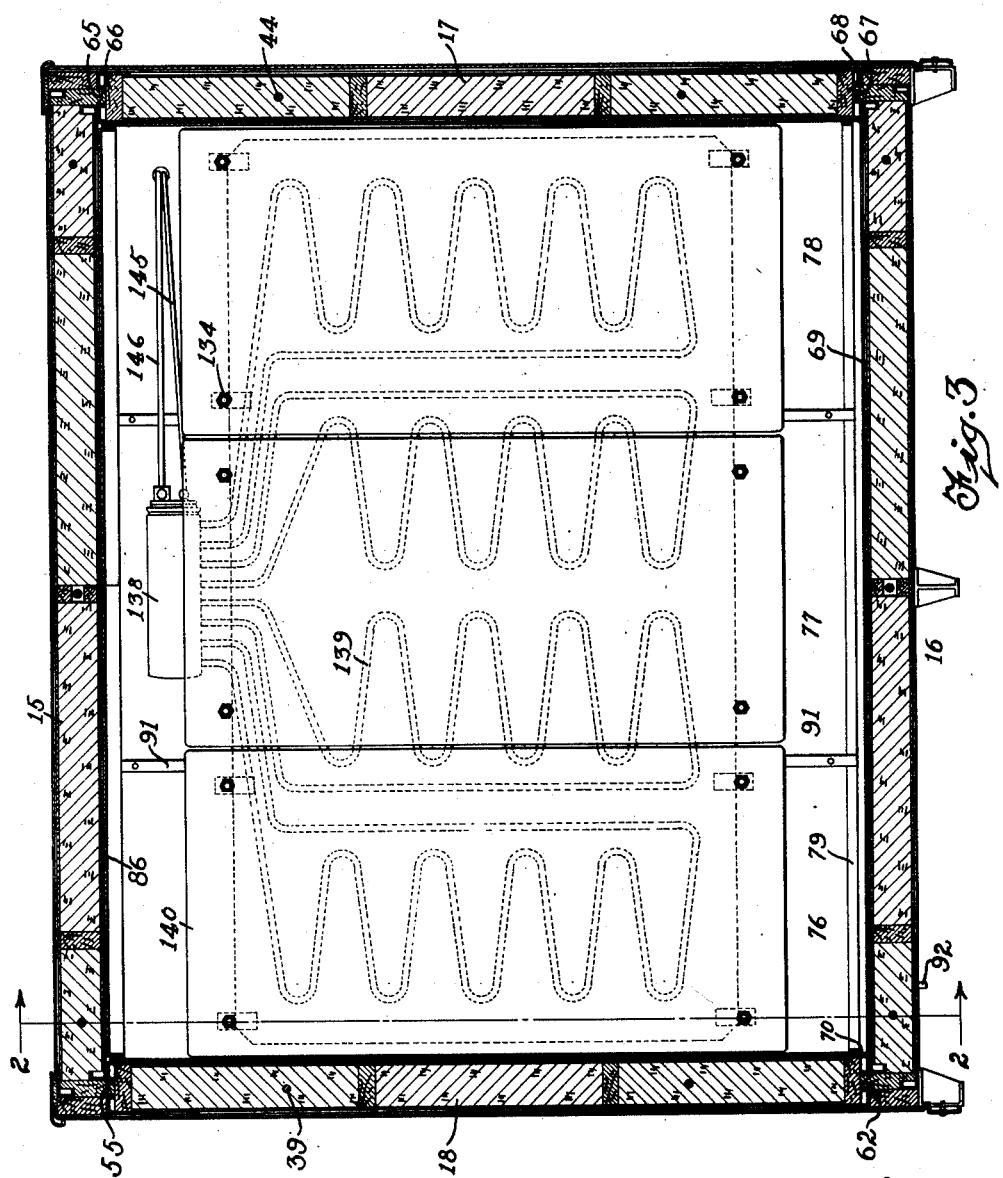

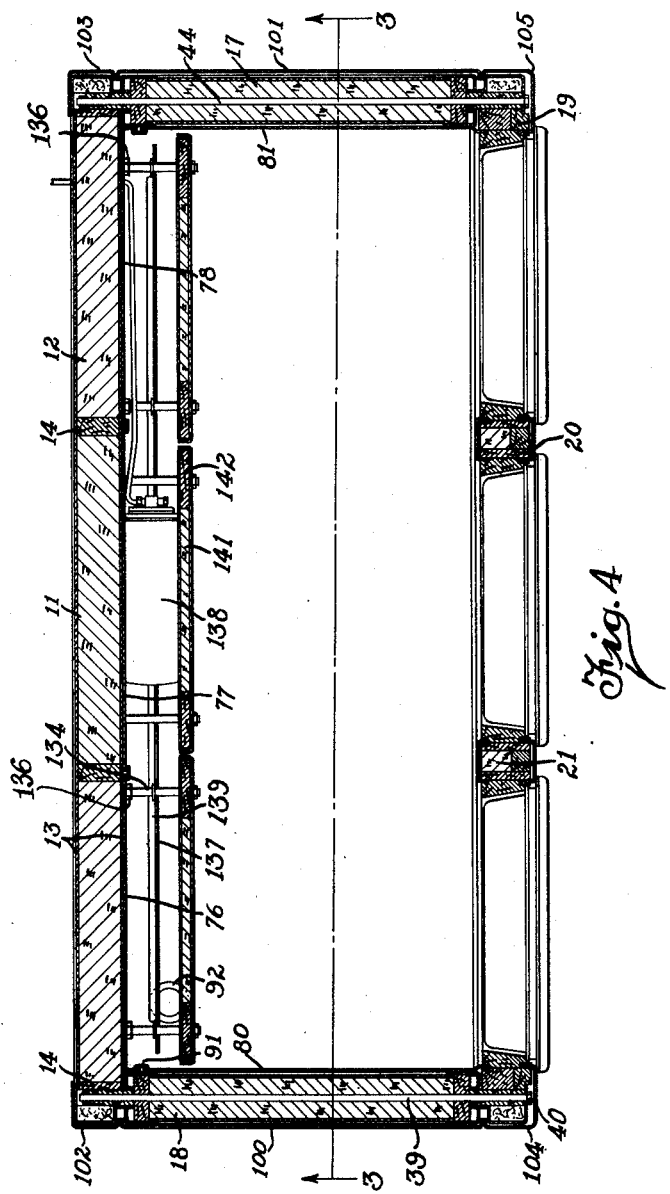

Feb. 27, 1934.  J. A. MACREADY ET AL  1,948,587
REFRIGERATING APPARATUS
Filed June 29, 1929    7 Sheets-Sheet 5
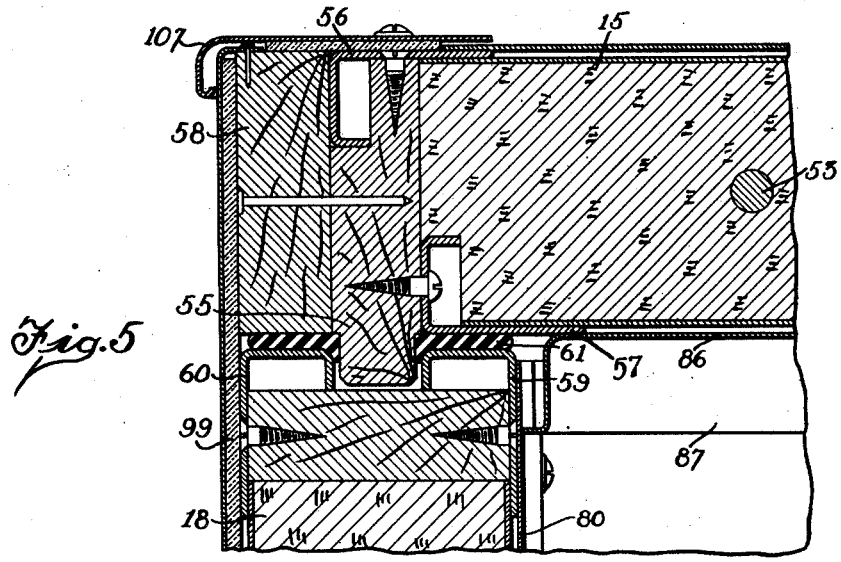
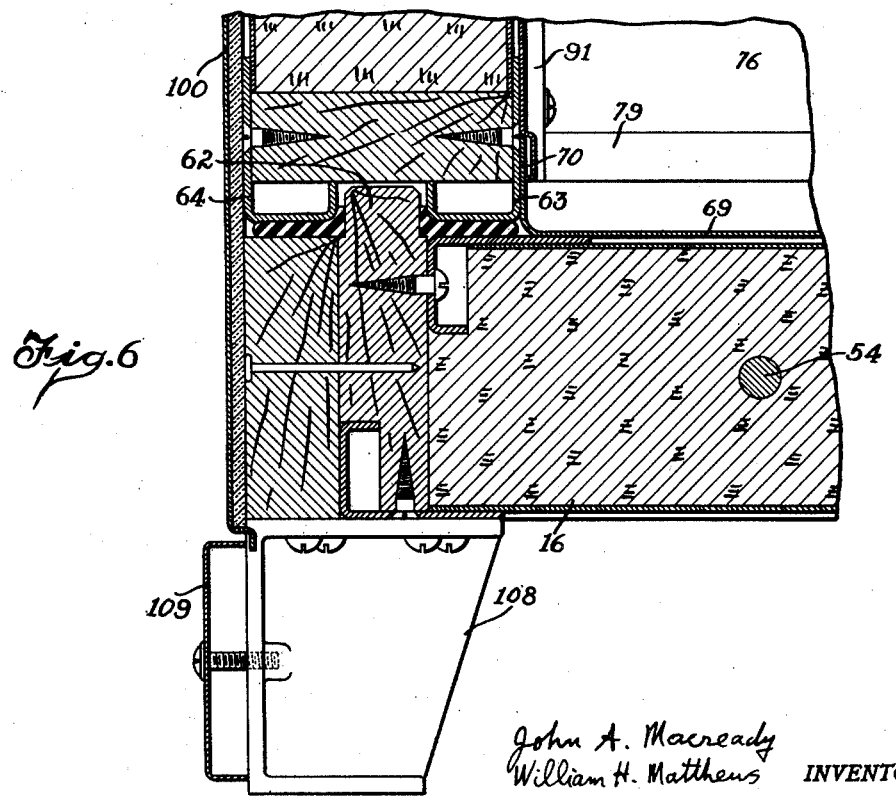
John A. Macready
William H. Matthews  INVENTOR
BY
Spencer, Hardman & Fehr  ATTORNEY Feb. 27, 1934.  J. A. MACREADY ET AL  1,948,587
REFRIGERATING APPARATUS
Filed June 29, 1929  7 Sheets-Sheet 6

John A. Macready
William H. Matthews
Inventor

By Spencer Hardman & Fehr
Attorney

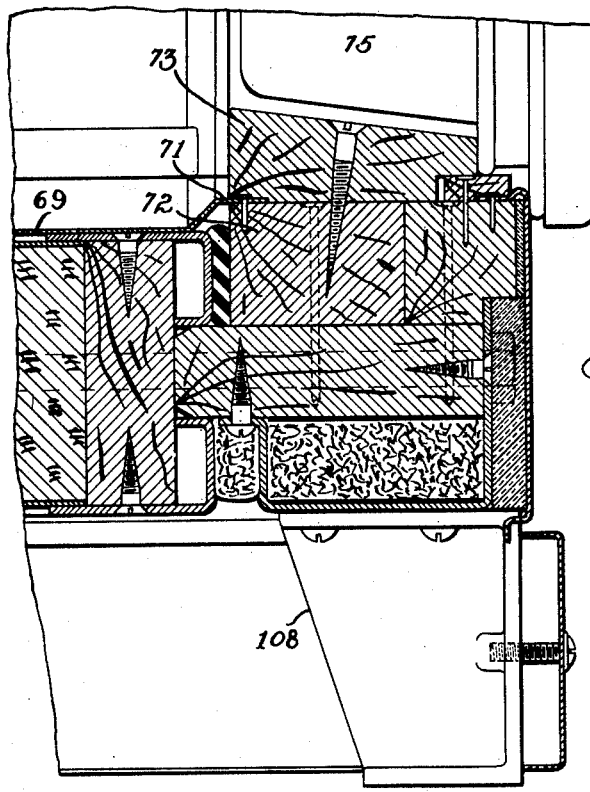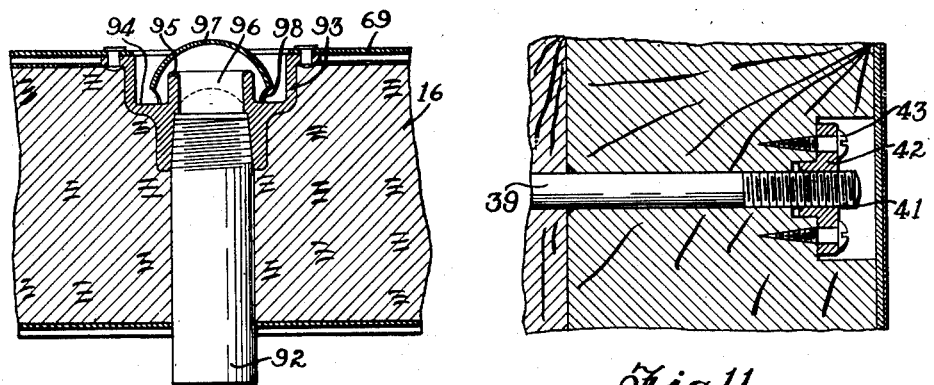

Patented Feb. 27, 1934

1,948,587

UNITED STATES PATENT OFFICE 1,948,587

REFRIGERATING APPARATUS

John A. Macready and William H. Matthews, Dayton, Ohio, assignors to Frigidaire Corporation, Dayton, Ohio, a corporation of Delaware Application June 29, 1929. Serial No. 374,640

4 Claims. (Cl. 220—9)

This invention relates to refrigerating apparatus and especially to the large type of commercial refrigerator cabinets.

An object of the invention is to provide an easily assembled large commercial refrigerator cabinet.

Another object of the invention is to have a large so-called knock-down cabinet with substantially the same efficient standards of factory assembled commercial refrigerators.

More specifically the invention contemplates forming the various elements of a large commercial cabinet so that it can be shipped in sections and assembled together by the ordinary skilled workman. This construction calls for interchangeable parts with special precaution used to prevent the cold escaping from the joints of the cabinet. Accordingly the shape and material of each element has been selected not only for its own special function but also for its co-operation with the other elements in forming an easily assembled and efficient refrigerator cabinet.

Further objects and advantages of the present invention will be apparent from the following description, reference being had to the accompanying drawings, wherein a preferred form of the present invention is clearly shown.

In the drawings:

Fig. 2 is a vertical transverse cross-section through the cabinet on lines 2—2 of Fig. 3;

Fig. 3 is a vertical longitudinal cross-section through the cabinet on lines 3—3 of Fig. 4;

Fig. 4 is a horizontal cross-section through the cabinet with the cooling unit in elevation;

Fig. 5 is an enlarged view of the upper left hand portion of Fig. 3;

Fig. 6 is an enlarged view of the lower left hand portion of Fig. 3;

Fig. 9 is an enlarged view slightly to one side of the tie-rod in Fig. 2;

Fig. 11 illustrates the preferred construction of one end of the tie-rod; and

Fig. 12 illustrates a preferred construction of the drain.

Figure 1:
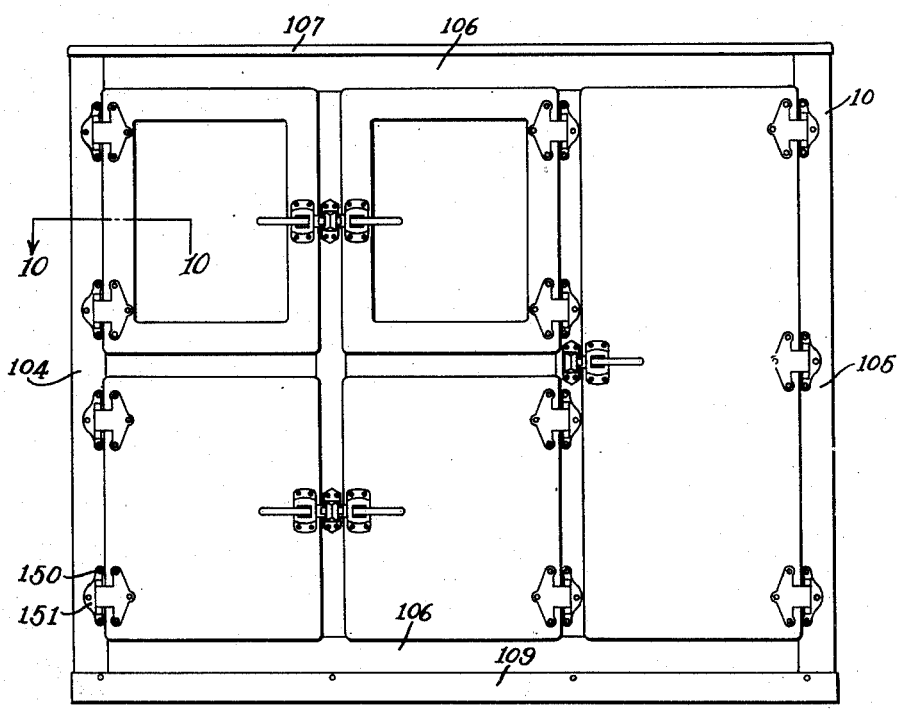
Fig. 1 is a front view of the cabinet in elevation.

Very large refrigerators of the commerical type have hitherto presented a very difficult problem in their construction and installation. Where a large sized refrigerator, such as one enclosing 100 cubic feet storage space and commonly referred to as a walk-in cabinet has been installed it has hitherto been necessary to send specially skilled and trained workmen to set up the various parts of the refrigerator cabinet and in fact the refrigerator cabinet was generally firmly built-in in the place where it was to be installed. Due to the fact that cement or other sealing material generally had to be applied in the plastic state and hardened, the cabinet structure when once built was not readily shifted about without damage to some parts of its structure. In general the large commercial cabinets of the prior art were constructed to remain indefinitely in the place where they were installed. Where this was not done, it generally followed that a sacrifice of refrigeration efficiency was made due to the faulty method of assembling the structure.

It is one of the objects of this invention to have a large refrigerator cabinet which will have the standard efficiency of the smaller cabinets and yet be one that can be assembled or disassembled without the use of specially skilled workmen in cabinet structure. Furthermore it is one of the purposes of this invention to provide a large refrigerator cabinet that may be shipped in sections for assembly at any desired place. It is also the purpose of the invention to have a large commercial refrigerator that can be dis-assembled, moved to another place and re-assembled if desired.

In the drawings is disclosed several views of a large commercial refrigerator embodying the invention. The preferred manner of assembling this cabinet is to have the front, back, bottom and top and the two end walls formed of their insulated material in separate sections. In this manner the insulated walls may be shipped in sections very conveniently. The preferred type of joint between the various sections is a tongue and grooved joint. It is preferred to have one part of this joint made of wood or some other material which is a very poor conductor of heat and thus forms a strong insulation. The other part of the joint is preferably of some metal material such as steel for the desired strength necessary in cabinets of this size. Furthermore it is preferred to have a tongue formed of wood and a groove at least partly formed of steel or other metal and this groove having a gap in its metal parts to avoid the leakage of heat across the same.

The preferred general method of assembling the cabinet is to have the complementary tongues and grooves on the sections. As disclosed on the drawings it is preferred to have a tongue about the periphery of the front and rear sections to fit into the complementary grooves on the grooves of the top, bottom and side sections. Tongues on the top and bottom sections fit into complementary grooves on the side sections. A plurality of tie-rods extend to certain portions of the cabinet to bind the structure together. The inner coating is then firmly installed in the storage chamber of the refrigerator and the outer covering and doors placed on the outside of the cabinet.

Referring more specifically to the drawings we have the front view of the assembled cabinet 10 illustrated in Fig. 1. Various cross-sections through the cabinet are illustrated in Figs. 2, 3 and 4. The remaining figures disclose enlarged portions of the various parts of the cabinet to bring out the invention in greater detail and to illustrate certain elements which are too small to be clearly disclosed in the other cross-sections. The rear or back section 11 is preferably formed of a plurality of insulation slabs 12 such as rock cork suitably enclosed in some strong casing 13 such as galvanized iron in combination with spacing members 14 of a structurally strong but poor heat conductor such as wood. The metal 13 protects each side of the insulation from damage and the wood 14 while acting as a strong spacer also prevents heat leakage across the section. In the formation of this section the insulation and inner sides of the casing 13 and frame members 14 is thoroughly coated with a bituminous cement to avoid any still further possibilities of heat leakage. A top section 15 is also similarly formed of insulation enclosed in a similar casing as is also the bottom portion 16 and the end or side sections 17 and 18. The front section 19 is formed preferably of a plurality of frame members 20 upon a framework for the doors of the cabinet. Wherever possible these frame members enclose an insulation 21 such as rock cork suitably coated with a bituminous cement.

Figure 7:
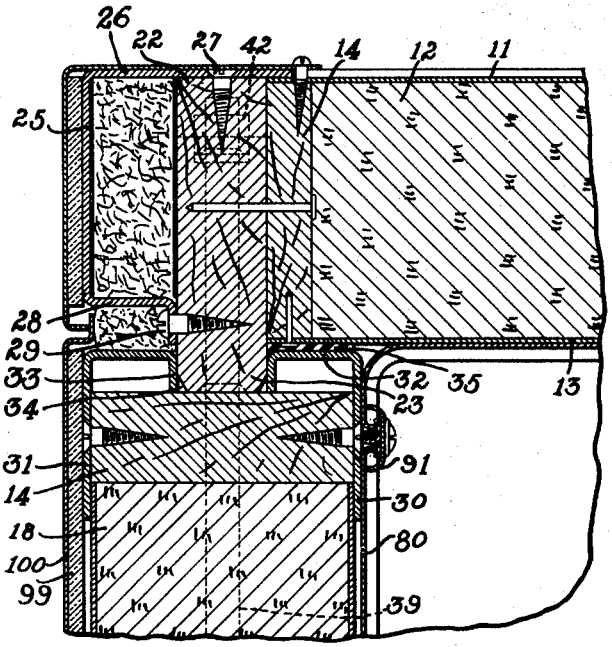
Fig. 7 is an enlarged view slightly to one side of the tie-rod in the upper left hand portion of Fig. 4.

As disclosed more particularly in Fig. 7 the frame member 14 enclosing the end of the insulation 12 has preferably attached thereto a frame member 22 having a tongue portion 23 projecting from the plane of the section 11. A strip of insulation such as mineral wool enclosed in a paper cover 25 is preferably placed on the outside of the frame member and is in turn preferably enclosed by a metal member 26 secured to the rear of the tongue member by the screw 27. After enclosing the insulation member this metal member is bent downward at 28 to the front part of the tongue member and is secured thereto by screw 29. The side member 18 has preferably two metal pieces 30 and 31 secured to the spacing frame member 14 and are bent over across the face and spaced therefrom as at 32 and then are bent downward in contact with the outer face of the frame member as at 33. The space 34 between these metal pieces prevents any heat leakage from one metal piece to the other. While the two metal pieces provide a very strong groove it is clear that one of these might be eliminated if desired. In such case it would probably be preferable to eliminate the outer piece 31. A compressible insulation such as the sponge rubber 35 has previously been placed between the metal member 30 and the adjacent face of the insulation casing 13.

Figure 8:
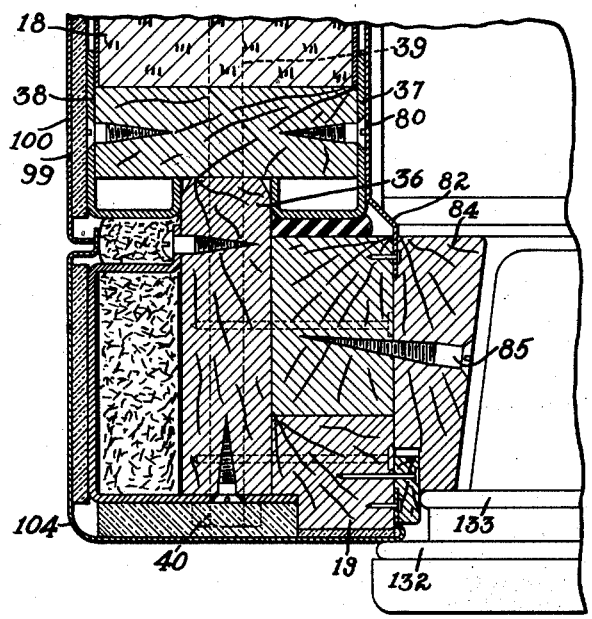
Fig. 8 is an enlarged view slightly to one side of the tie-rod in the lower left hand portion of Fig. 4.

As disclosed in Fig. 8 a tongue 36 similar to the tongue 23 extends from the front 19 in the direction of the side member 18. Side member 18 also has a groove preferably formed of metal members 37 and 38 similar in form and shape to the members 30 and 31. As disclosed in full lines on the left of Fig. 4 or in dotted lines in Figs. 7 and 8, a tie-rod 39 extends from the front portion through it and the sides and rear portions to bind the three together. It is preferred to have the head 40 of the tie-rod integral at one end thereto and to have the other end 41 screw-threaded as disclosed in Fig. 11. A cap or nut 42 is preferably securely fastened to the frame member at 22 by the screws 43 and is screw threaded to receive the end 41 of the rod. Accordingly the tightening of the head 40 of the tie-rod will very firmly bind the tongues 23 and 36 in the respective grooves formed by the members 30, 31, 37 and 38. Any desired number of these tie-rods may be used to extend through the front, side and rear sections to bind these three together.

A similar construction with the tie-rods 44 bind the side section 17 with the front and rear sections of the cabinet.

The rear section 11 also preferably has the tongue 45 extending along the upper part thereof and a tongue 46 extending along the base of the section. The front portion 19 preferably has the tongue 47 extending along the upper inner face of the section and also the tongue 48 extending along the inner face of its bottom portion. These tongues are preferably similar in construction to the tongues previously described. The top section 15 and the bottom portion 16 have the grooves 49, 51, 50 and 52 respectively complementary to the tongues 45, 47, 46 and 48. A plurality of tie rods 53 extend through the top section 15 and another plurality of tie-rods 54 extend through the bottom portion 16 and bind them securely between the front and rear sections of the cabinet.

As disclosed in Fig. 5 the top portion 15 has a tongue 55 attached thereto and extending downwardly from its end portion. This tongue has a plurality of metal supporting pieces 56 and 57 attached thereto and furthermore has preferably an outer frame member 58 for further strengthening thereof. The upper face of the side member 18 has a groove thereon preferably formed of the metal members 59 and 60 similar in construction to the grooves heretofore described. A compressible insulation such as sponge rubber 61 is placed on the outer faces of the groove prior to the insertion of the tongue 55 into the groove. The top section is rather heavy and accordingly its weight will insert the tongue 55 to a suitable depth in the groove formed by the members 59 and 60. The position of the top section as previously described has been determined by the tongues 45 and 47 on the rear and front sections of the cabinet. A tongue 62 also projects up from the lower section 16 and is inserted in a groove formed by one of the metal members 63 and 64 on the lower portion of the said member 18 as disclosed in Fig. 6. A similar tongue 65 and the upper section section fits into the complementary groove 66 on the upper face of the other side section 17 and another tongue 67 on the upper section fits into a complementary groove 68 on the bottom of the side section 17.

It will thus be noted that a very strong frame portion has been assembled composed of wooden frame members forming structurally strong insulators and metal members for the additional strength necessary in this cabinet. These members are so constructed and assembled that there is no danger of great leakage between the inside to the outside of the frame construction.

The method of assembling the inner lining of the storage compartment will now be described. The bottom section is preferably covered with a one-piece lining 69. This lining has a short flange 70 extending upward on the rear and both ends. The front edge of this lining 69 preferably has a projecting edge 71 extending on top of lower frame members 72 of the front section 19 as disclosed in Fig. 9. The sill or molding 73 for the doors 75 is then secured to the frame member 72 thus sealing the edge of the flange 71. A plurality of strips 76, 77, and 78 are then preferably secured to the rear walls. These strips preferably have a flange 79 extending over the flange 70 on the bottom lining 69 and making contact therewith. The strips 76 and 78 project slightly around the inner corner and are there adjacent to the edge of the strips 80 and 81 covering the major portion of the end sections. These strips 80 have an offset flange 82 extending over the frame member 83 in the front section member 19. The side members or molding 84 of the end doors are then attached to the frame members 83 by the screws 85 as disclosed in Fig. 10 thus sealing the edge of the flange 82. The top lining 86 is secured to the top section 15 and preferably has a flange 87 extending over the lining strips on the rear and side portions. This top lining 86 preferably has an offset flange 88 extending over the frame member 89 of the top section and a top or head or molding 90 of the upper door frame members is secured to the frame member 89 and seals the edge of the offset flange 88 therebetween. A plurality of U-shaped strips 91 are placed over the vertical juncture of the lining strips on the rear and side sections as disclosed in Figs. 3 and 4 and 7. Accordingly any moisture that would gather on the top lining 86 or upon the side strips 76, 77, 78, 80 or 81 would not have any chance to get back of the lining due to the overlapping flanges and the U-shaped strips 91. Furthermore the top and side and bottom linings are inserted between the juncture of the frame members at the doors and the frame members of the front section 19, this being water-tight. These lining strips may be suitably coated as with porcelain or with any other easily cleaned and non-rusting or non-tarnishing coating.

The bottom lining 69 is preferably suitably sloped towards a drain 92 more particularly disclosed in Fig. 12. This drain preferably has a metal member 93 secured at its periphery to the lower lining 69. This metal member 93 has a depressed portion 94 surrounding a raised portion 95 about the drain hole 96. A suitable bonnet 97 covers the major portion of the raised part 95. Holes 98 in the bonnet rest on the depressed portion 94 allow the passage of water therethrough to the drain hole 96. As moisture will undoubtedly be present in the depressed portion 94 about the height of the holes 98 there will be no air passage for heat leakage through this moisture.

The exterior of the framework is preferably covered with thin slabs of wall board 99 or any other material to absorb the shock of any impact against the other panels. The outer panels are then placed over this wall board and secured thereto. These outer panels are preferably coated or covered with porcelain or with a pleasing pyroxyline paint. As disclosed in Fig. 4 an outer panel 100 covers the end section 18 and the outer panel 101 covers the end section 17 and are secured thereto by any convenient and pleasing fastening means. The two rear corner pieces 102 and 103 suitably cover the rear corners and lap over the edges of the members 100 and 101. Front corner pieces 104 and 105 suitably cover the front corner pieces and are secured thereto by the screws 150 attaching the hinges 151 thereto. A plurality of strips 106 cover the framework around the doors. Another strip 107 extends over the upper edge of the cabinet. Very strong feet 108 preferably of metal are placed under the cabinet at the corners thereof and have attached thereto a panel 109 extending along the front and sides of the cabinet and suitably covered or coated similar to the cabinet.

Figure 10:
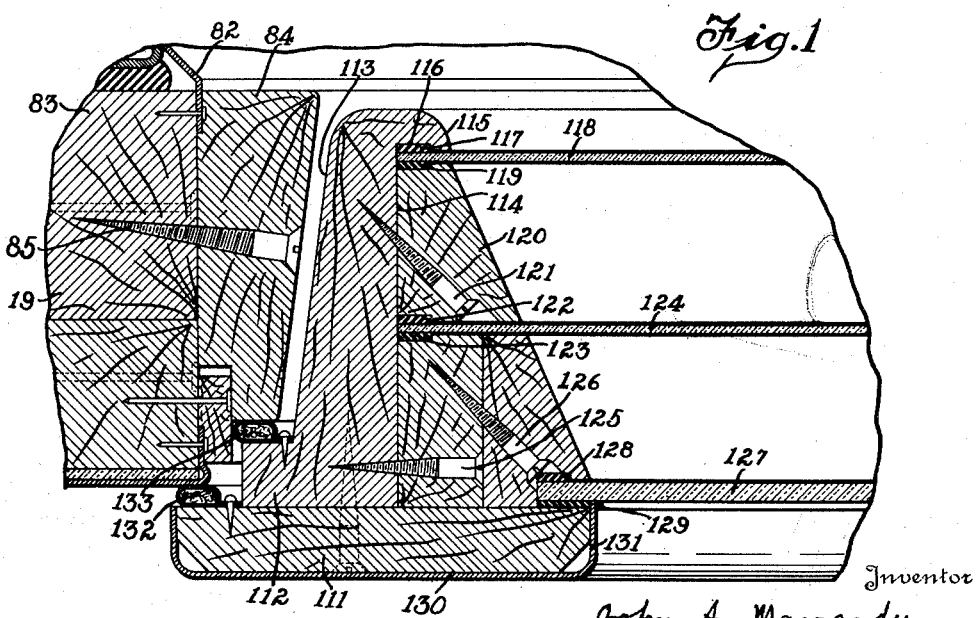
Fig. 10 is an enlarged cross-section on line 10—10 of Fig. 1 disclosing the door construction.

The preferred construction of the glass doors 110 is disclosed in Fig. 10. An outer framework 111 surrounds the edge of the door and has attached to the rear thereof a frame member 112. This frame member 112 has a tapered outside edge 113 and preferably a straight inner edge 114. A tapered edge 113 curves around into a lip 115. This lip has an insert 116 made on its inner face and a piece of sponge rubber 117 is placed therein. The inner pane of glass 118 is then placed against this rubber 117. Another piece of rubber 119 is placed against the glass about its edge and another frame member 120 is placed on the edge 114 at the frame member 112. This frame member 120 has a slight depression at the location of the rubber member 119. A screw 121 is then driven obliquely through the members 120 and 112 thus suitably compressing the rubber 117 and 119 about the edge of the glass 118 and making it air-tight. Other bands of sponge rubber 122 and 123 are suitably compressed about the edges of the glass panel 124 by the fastening means 125 and 126. A glass panel 127 also has the sponge rubber piece 128 and 129 inserted about its edges. The outer covering 130 for the door has a flange 131 projecting into the rubber 129 and thus making the outer panel 127 air-tight. Accordingly if the door elements disclosed in Fig. 10 are assembled in a dry atmosphere there will be no moisture between the panels 118 and 127 to cloud the panels but a clear view is always visible through the glass doors. A double seal 132 and 133 about the doors makes them additionally proof against heat leakage.

A preferred type of cooling unit and its support is also disclosed in the drawings. While it is obvious that any type of cooling unit might be inserted therein the particular type illustrated and its support have been selected both from the standpoint of efficiency and ease of assembly. A plurality of short rods 134 preferably extend through suitable wooden frame members 135 in the rear section 11. These rods have the nuts 136 thereon for securing the back lining strips 76, 77 and 78 to the rear section 11. Evaporating plate 137 is supported on these rods 134. A header 138 is supported at the top of this plate and has a plurality of loops or ducts 139 extending from its lower portion and attached in good thermal contact to this evaporating plate 137 as illustrated in Figs. 2, 3 and 4. These ducts 139 suitably extend over the various portions of the plate in order that the refrigerant contained therein may suitably chill the entire surface of the plate. In order that an efficient circulation may be set up in the cabinet a plurality of baffles 140 are supported on the inner end of the rods 134. These baffles are preferably constructed with an inner layer 141 of insulation such as rock cork supported in a wooden framework 142 and covered on the outside with a suitable casing 143 and 144. The outer casing 143 being visible may be coated with porcelain to provide a pleasing appearance, while the inner covering 144 not being visible may be of galvanized iron. These baffles extend from a short distance from the top to a short distance above the bottom section as disclosed in Fig. 2. The air on both sides of the plate will be chilled by its heat being absorbed by the plate and refrigerant in the ducts 139. This chilled air will accordingly descend to the bottom of the refrigerator and at the bottom of the refrigerator will be displaced by further cold air descending towards the bottom. As this cold air absorbs heat on the other side of the baffle it will rise towards the top of the refrigerator and will be drawn over the top of the baffles by the suction created by the descending air which has been chilled by the plate. Accordingly these baffles provide a very efficient circulation of air in the refrigerator cabinet. It will also be noted that the supporting rods 134 perform the three-fold duty of supporting the lining strips 76, 77 and 78 and also support the header 138 and its plate 140 and also the baffles 142.

The liquid refrigerant supply line 145 and the refrigerant return line 146 are connected to any suitable refrigerating liquefying apparatus such as disclosed in the patent to G. M. Troup, No. 1,704,522, issued March 5, 1929. The header 138 is preferably of the flooded float controlled type disclosed in the patent to R. G. Osborn, No. 1,556,708, issued October 13, 1925.

Tests on a cabinet of approximately 100 cubic feet of storage space constructed according to the invention have demonstrated that the desired temperature of approximately 40° F. can be readily and economically maintained therein. Furthermore on a special test assembly, the cabinet was completely assembled in 45 minutes.

Accordingly there has been disclosed a refrigerator cabinet of very large size that can be shipped in sections and assembled without any special cabinet skill and which when so assembled will have the efficiency of cabinets of smaller construction.

While the form of embodiment of the invention as herein disclosed constitutes a preferred form, it is to be understood that other forms might be adopted, all coming within the scope of the claims which follow.

What is claimed is as follows:

1. A knock-down refrigerator cabinet comprising a plurality of walls, each wall including inner and outer spaced metal plates, insulating material between said plates, some of said walls having the metal plates extending inwardly and bent to form a groove, the complementary walls having tongues extending into said grooves, thereby providing a breaker strip between said metal walls.

2. A knock-down refrigerator comprising a plurality of walls, each wall including inner and outer spaced metal plates, insulating material between said plates, some of said walls having the metal plates extending inwardly and bent to form a groove, the complementaray walls having tongues extending into said groove, tie rods extending through said walls, said tongues forming breaker strips between said inner and outer metal walls.

3. A knock-down commercial refrigerator cabinet comprising a plurality of walls, each wall including inner and outer spaced metal plates, insulating material between said plates, a structural non-conducting frame member for holding said plates in spaced relation, some of said walls having the metal plates extending inwardly and bent to form a groove, the complementaary wall having tongues extending into said groove, thereby providing a breaker strip between the metal walls and a resilient material having a low heat conductivity between the complementary portions of said walls for preventing air leakage through said joints.

4. A knock-down commercial refrigerator cabinet comprising a plurality of walls, each wall including a framework of non-conducting material, insulation enclosed within the framework, metal plates on either side of the insulation and sheet metal binding strips at the edges of said walls mounted upon said framework, said binding strips having their edges extending inwardly and bent to form a groove, the complementary walls having tongues extending into said grooves, thereby providing a breaker strip between said binding strips.

JOHN A. MACREADY.
WILLIAM H. MATTHEWS.